Feb. 24, 1970     W. W. SCHAPIRA     3,497,847
DRIVING HUB FOR ROTATING SHAFT
Filed May 17, 1968     3 Sheets-Sheet 1
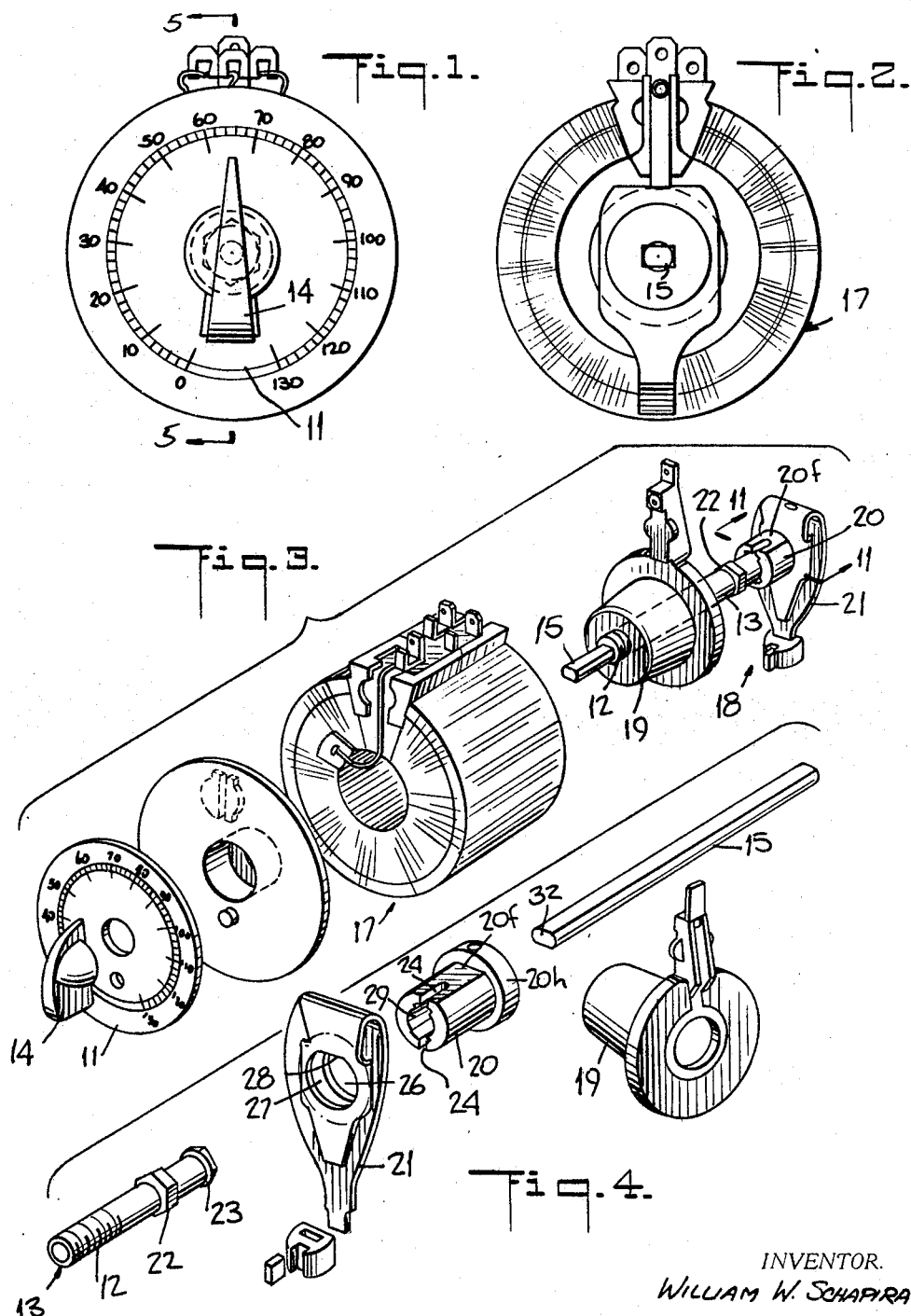
INVENTOR.
WILLIAM W. SCHAPIRA
BY
Merch, Gillette + Wyatt
ATTORNEYS Feb. 24, 1970   W. W. SCHAPIRA   3,497,847
DRIVING HUB FOR ROTATING SHAFT
Filed May 17, 1968   3 Sheets-Sheet 2
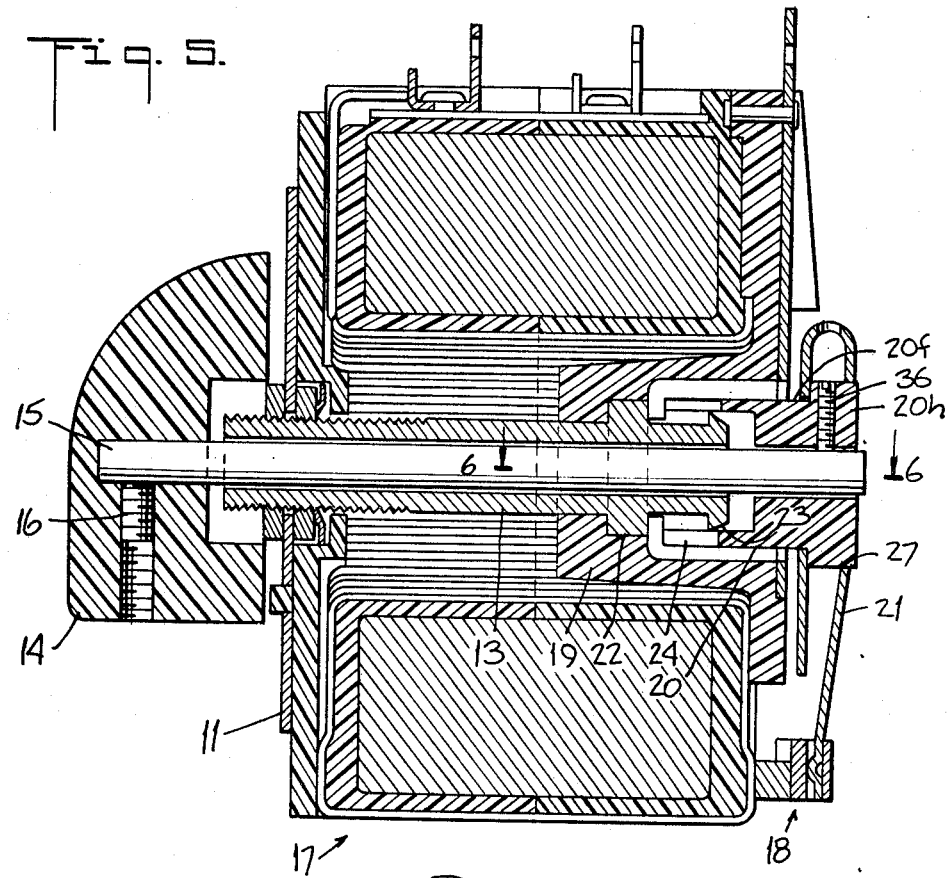
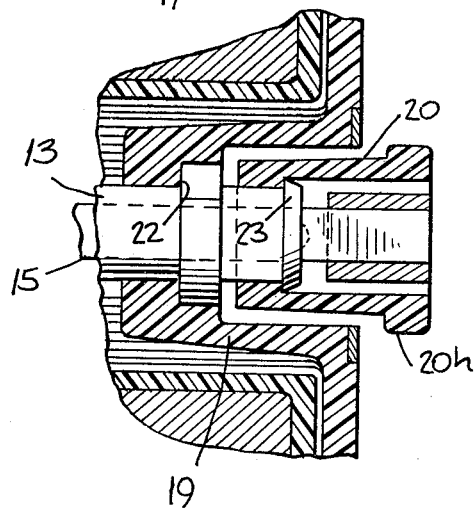
INVENTOR.
WILLIAM W. SCHAPIRA
BY
March, Gillette & Wyatt
ATTORNEYS

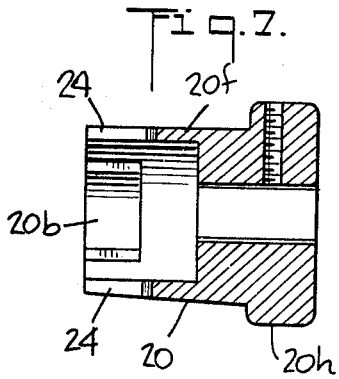
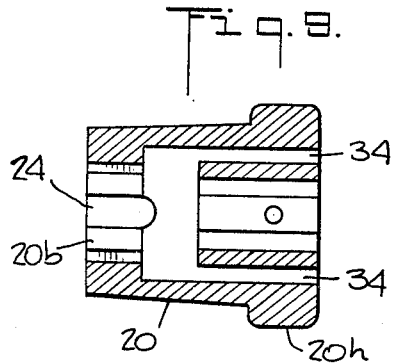
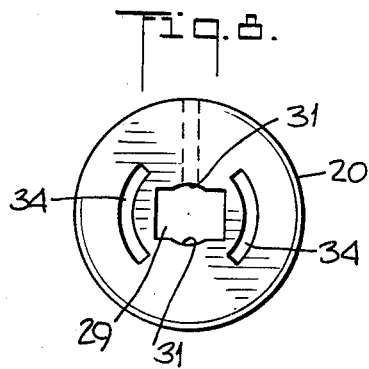
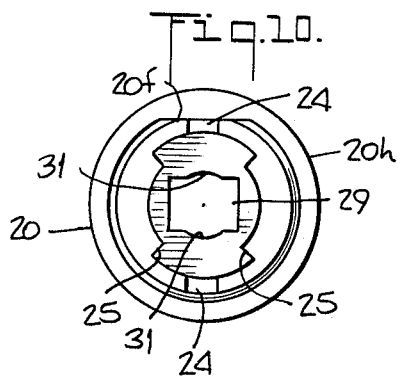
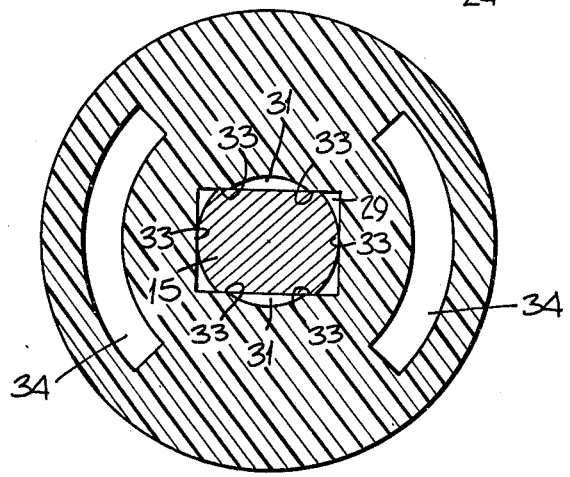

United States Patent Office 3,497,847
Patented Feb. 24, 1970

---

3,497,847
DRIVING HUB FOR ROTATING SHAFT
William W. Schapira, Skokie, Ill., assignor to Consolidated Electronics Industries Corp., Ohmite Manufacturing Company Division, Skokie, Ill., a corporation of Delaware
Filed May 17, 1968, Ser. No. 730,083
Int. Cl. H01f 29/06
U.S. Cl. 336—149                 13 Claims

ABSTRACT OF THE DISCLOSURE

Driving hub for rotating shaft devices such as variable transformers wherein the shaft may be removed from the remainder of the assembly without effecting the function of the device and which permits its complete replacement or its movement axially, without any substantial axial movement of the hub and shaft relative to each other, when a shaft projection is needed, and which eliminates backlash, and is simple and economical in construction and assembly and employs only two parts, namely, a single driving hub member which has a wedge fit on the contact or driven arm and a snug fit on the shaft. The hub member is of plastic material capable of being deformed slightly during assembly with other components but having a memory characteristic that causes it to return to its original configuration. For example, the hub may be formed of a thermoplastic polyamide, such as nylon, with an internal recess into which a shouldered end of the bushing for the shaft is forced by distortion of the hub member. The end of the shaft engages the hub member at spaced areas, only, thereby reducing the friction encountered in relative axial movement while retaining rotational driving relation therebetween.

---

This invention relates to rotating shaft devices such as variable transformers and more particularly to a new and improved driving hub assembly wherein the shaft may be removed from the remainder of the assembly without affecting the function of the device and which permits its complete replacement or its movement axially when a shaft projection is needed at the opposite end and which eliminates rotational backlash.

In the past, driving hubs for rotating shaft devices such as variable transformers, as will be seen in Patent 3,316,517 of Apr. 25, 1967, to Ellin, included seven components as follows:

A split or two-part driving hub in which the two parts of the hub were held in assembled relation by a retaining ring in a groove on the hub halves and which holds the end of the bushing for the drive shaft which is retained therein by a retaining washer. In addition, this construction required a wear washer and a shaft lock clamp, all as will be seen in Patent 3,316,517.

In this prior device, the construction required to form the parts and assemble the bushing, wear washer, retaining washer, two halves of the driving hub, shaft lock clamp and retaining ring was both expensive and time consuming, thus resulting in a costly subassembly, and containing certain inherent disadvantages.

Furthermore, since practical manufacturing tolerances must be allowed for the fit between the shaft lock clamp and the driving hub, and also for the fit between the hub and the contact arm, the result is that an undesirable amount of backlash is created in the complete assembly between the shaft and the arm for the contact brush. Also contributing to this is the fact that the set screw in the shaft lock clamp which is tightened on one of the two flat surfaces on the shaft has a tendency to eventually rock itself loose to some extent, if not perfectly centered when originally tightened.

The principal object of the present invention is to provide a new and improved driving hub assembly for rotating shaft devices, such as variable transformers, which overcome the disadvantages of the prior art arrangement, and the provision of such a device which is relatively simple and economical in construction and assembly and which is constructed of a minimum number of parts.

Another object of the invention is to provide a new and improved device of the type set forth which permits the driving hub to rotate with respect to the bushing but at the same time avoids any substantial axial movement of these two parts with respect to one another, and since the contact arm is driven by the driving hub, the transformer can actually function electrically and mechanically even when the shaft is absent.

Another object is to provide such a device wherein rotation of the hub relative to the bushing is permitted but not substantial axial movement of the two parts away from one another, and wherein axial movement or even complete removal of the shaft is permitted after loosening of a set screw.

Another object is to provide such a device wherein backlash between the shaft and contact arm is completely eliminated.

Other objects and advantages of the invention will be apparent from the following description taken in connection with the accompanying drawings and while the invention has been shown and described as applied to a variable transformer, this has been only for the purpose of illustration of the invention which is also applicable to other rotating shaft components and devices.

Referring to the drawings:

FIG. 1 is a front elevational view of a variable transformer unit embodying the invention;

FIG. 2 is a rear elevational view of the variable transformer unit of FIG. 1;

FIG. 3 is an exploded perspective view of the variable transformer unit of FIG. 1 and FIG. 2;

FIG. 4 is an exploded perspective view of the drive shaft assembly of the variable transformer unit embodying the invention;

FIG. 5 is an enlarged, central sectional view taken along line 5—5 of FIG. 1;

FIG. 6 is a fragmentary, central sectional view taken along line 6—6 of FIG. 5;

FIG. 7 is a longitudinal sectional view of the driving hub of the present invention;

FIG. 8 is an end view of the driving hub shown in FIG. 7;

FIG. 9 is a longitudinal sectional view of the driving hub taken at a ninety degree angle from the sectional view of FIG. 7;

FIG. 10 is an end view of the driving hub from the end opposite that shown in FIG. 8; and FIG. 11 is a sectional view taken on line 11—11 of FIG. 3.

Referring more particularly to the drawings wherein similar reference characters designate corresponding parts throughout, the variable transformer in which the improved driving hub assembly has been embodied, for the purpose of illustrating the invention, is generally similar to that of Patent 3,316,517, and comprises a dial and mounting plate assembly including a dial plate 11 which is provided with a central aperture through which passes the threaded end 12 of a bushing 13 and through which extends a drive shaft 15 which has opposed flat surfaces and on which shaft is fixed a manual knob 14 by a set screw 16.

The variable transformer includes a core and winding assembly 17 and a drive shaft and contact arm assembly 18. The drive shaft and contact arm assembly 18 is arranged for adjustment in position of the drive shaft with facility and from either the front or the rear of the transformer unit.

As will be seen from FIGS. 3 and 4, the drive shaft assembly includes an upper hub support 19, an insulated driving member 20, a contact arm unit 21, the drive shaft 15, and the bushing 13.

The bushing 13 is provided with an external hexagon or other shaped portion 22 as the bushing 13 is intended for non-rotatable mounting relative to the upper hub support 19. The bushing 13 is also provided with a shoulder 23 at the end thereof adapted to be inserted in the bore in the hub member 20, and this shoulder 23 is preferably tapered, as shown in FIGS. 5 and 6 to facilitate its entry into the bore or recess in the hub member 20.

The driving hub 20 is preferably made of plastic material which combines the qualities of extreme toughness, strength, elasticity and memory and is capable of being manufactured by a relatively economical process. Such material preferably can stand a great deal of physical abuse without cracking, breaking or permanent loss of shape and is also an excellent bearing material, so that it does not require the use of a wear washer between the bushing collar and hub member. Materials having such characteristics include thermoplastic polyamide materials, such as nylon, for example.

The choice of nylon or similar material for the hub member 20 permits not only the required tight fit on the shaft 15, as well as on the contact of driven arm 21 but also the insertion of the bushing 13 into a bore 20b in the hub member 20 during which considerable temporary distortion in the shape of the hub member takes place.

The hub member 20 has an internal recess, or bore 20b in which the end of the bushing 13 having the tapered shoulder 23 which is inserted by pressure while the parts are axially aligned. Two U-shaped slots 24 in the end of the hub member allow this end of the hub to open up temporarily or to be distorted while the insertion of the tapered bushing end 23 takes place. The nature of the deformation of the hub is such that its memory causes it to return to its original shape after the insertion of the tapered end 23 of bushing 13 has been completed.

The end of the hub 20 is provided with internal flanges 25 between the slots 24, as shown in FIG. 9 for engagement with the shoulder 23 on the bushing 13 to retain the end of the bushing 13 in the hub. When this occurs, the bushing 13 is then held captive by the hub 20, that is, the hub can turn with respect to the bushing but no substantial axial movement of the two parts away from one another can take place.

The contact spring or driven arm 21 includes a folded electrically conductive metal arm that has a circular opening 26 in one of its folded portions which is adapted to receive the head portion 20h of hub member 20 and the adjacent folded portion has an opening 27 with a flat side 28 adapted to receive the flat side 20f on the outside of driving hub 20 and permits a tight wedge fit between the driving hub and the corresponding flat 25 in contact spring arm 21.

The bore or internal opening of driving hub 20 for connection of the adjacent end of drive shaft 15 with the hub is specifically designed to make axial movement of the drive shaft 15 with respect to the hub as easy as possible, while at the same time retaining a "no backlash" rotational condition. The area of contact between these two parts in this connection and therefore the friction encountered in axial movement therebetween has been reduced as much as possible. This has been accomplished by enlarging a rectangular opening 29 on the hub by means of upper and lower circular recesses 31 so that the area of contact between the shaft 15, which has upper and lower flattened surfaces 32, and the hub has been reduced to six narrow spots or areas 33 which are indicated in FIG. 11. As will be seen in FIG. 11, two of these spots are on each flat surface adjacent the upper and lower corners of the shaft and one on each rounded end of the shaft adjacent the center thereof.

The hub member is provided with opposed arcuate slots 34 for facilitating the connection of the end of the shaft 15, in opening 26. This arrangement results in a snug fit between the shaft 15 and the hub 20, as far as rotational movement is concerned but at the same time permits an easy sliding fit in an axial direction. A set screw 36 is provided for location or locking the shaft 17 in axial relation with hub member 20.

It will be seen that in the present construction, backlash between the shaft and contact arm is completely eliminated because of the unitary driving hub which has a snug fit on the shaft 15, thus allowing no play between the hub and shaft, and also has a wedge fit on the contact or driven arm, thus allowing no play between the contact or driven arm 21 and hub member 20, and since set screw 36 serves only to locate the shaft 15 axially in hub 20, but not rotationally, all sources of backlash in previous constructions have been completely eliminated.

The operation of the invention is believed apparent from the foregoing description.

From the foregoing, it will be seen that I have provided new and improved means for obtaining all of the objects and advantages of the invention.

What is claimed is:

1. In a driving hub for a variable transformer or the like, a unitary hub member having a bore, a driven member, said hub member being keyed to said driven member, and a bushing having an end portion positioned in said bore in said hub member and a drive shaft extending through said bushing and connected to said hub member.

2. In a driving hub as claimed in claim 1, wherein the drive shaft has a portion in sliding axial relation and rotational driving relation with the hub member.

3. A driving hub as claimed in claim 1, wherein the bushing has an end portion with an external shoulder, said shoulder portion of said bushing being forcibly positioned within said bore of said hub member by distortion of said hub member.

4. A driving hub as claimed in claim 3, wherein the hub member is of plastic material capable of being deformed slightly and returning to its original shape.

5. A driving hub as claimed in claim 4, in which said hub member is of thermoplastic material.

6. A driving hub as claimed in claim 5, wherein the said bushing is of metal.

7. A driving hub as claimed in claim 5, wherein the hub member is of nylon.

8. A driving hub as claimed in claim 3, in which the shoulder portion of the bushing is tapered to facilitate insertion of the shoulder portion in the internal recess in the hub member.

9. A driving hub as claimed in claim 3, wherein the hub member is formed of a thermoplastic polyamide material and maintains said bushing in operative position, and the opening for said bore in said hub member into which the shoulder portion of said bushing is inserted is of such size that distortion in the shape of the hub member is required for such insertion.

10. A driving hub as claimed in claim 9, wherein the end of said hub member through which the shoulder portion of the bushing is inserted is slotted to facilitate distortion of the hub member during insertion of the shoulder portion of the bushing.

11. A driving hub as claimed in claim 2, wherein the drive shaft engages said hub member at spaced areas only thereby reducing the friction encountered in relative axial movement of the shaft and hub member while retaining rotational driving relation therebetween.

12. A driving hub as claimed in claim 11, wherein the hub member is of a thermoplastic polyamide material, and maintains said bushing in operative position and wherein the engagement of the shaft and hub member at spaced areas only is accomplished by forming a rectangular recess in the hub member with the rectangular recess being enlarged between the spaced contact areas.

13. A driving hub as claimed in claim 12, in which the hub member is provided with internal arcuate slots adjacent the connection of the shaft to said hub member for facilitating the connection of the shaft with said hub member.

References Cited

UNITED STATES PATENTS

| | | | |
|---|---|---|---|
| 2,985,857 | 5/1961 | Ellin et al. | 336—149 XR |
| 3,136,967 | 6/1964 | Snowdon et al. | 336—149 |
| 3,316,571 | 4/1967 | Ellin | 336—149 |

THOMAS J. KOZMA, Primary Examiner

U.S. Cl. X.R.

73—543; 287—52.04; 338—162